United States Patent
Sfadia et al.

(10) Patent No.: US 11,741,232 B2
(45) Date of Patent: Aug. 29, 2023

(54) SECURE IN-SERVICE FIRMWARE UPDATE

(71) Applicant: MELLANOX TECHNOLOGIES, LTD., Yokneam (IL)

(72) Inventors: Mor Hoyda Sfadia, Tel Aviv (IL); Yuval Itkin, Zoran (IL); Ahmad Atamli, Oxford (GB); Ariel Shahar, Jerusalem (IL); Yaniv Strassberg, Yokneam (IL); Itsik Levi, Shapir (IL)

(73) Assignee: MELLANOX TECHNOLOGIES, LTD., Yokneam (IL)

(*) Notice: Subject to any disclaimer, the term of this patent is extended or adjusted under 35 U.S.C. 154(b) by 73 days.

(21) Appl. No.: 17/163,599

(22) Filed: Feb. 1, 2021

(65) Prior Publication Data
US 2022/0245251 A1    Aug. 4, 2022

(51) Int. Cl.
*G06F 21/57* (2013.01)
*G06F 8/65* (2018.01)
*G06F 9/445* (2018.01)

(52) U.S. Cl.
CPC ............ *G06F 21/572* (2013.01); *G06F 8/65* (2013.01); *G06F 9/445* (2013.01); *G06F 2221/033* (2013.01)

(58) Field of Classification Search
CPC ........ G06F 21/572; G06F 21/575; G06F 8/65; G06F 21/70; G06F 21/57; G06F 9/445; G06F 2221/033
See application file for complete search history.

(56) References Cited

U.S. PATENT DOCUMENTS

| 6,070,012 | A | 5/2000 | Eitner et al. |
| 6,397,385 | B1 | 5/2002 | Kravitz |
| 6,535,924 | B1 | 3/2003 | Kwok et al. |
| 6,640,334 | B1 | 10/2003 | Rasmussen |
| 7,609,617 | B2 | 10/2009 | Appanna et al. |
| 7,661,025 | B2 | 2/2010 | Banks et al. |
| 8,190,720 | B1 | 5/2012 | Yellai et al. |

(Continued)

FOREIGN PATENT DOCUMENTS

EP    3176723 A1    6/2017

OTHER PUBLICATIONS

PCI Express® Base Specification, Revision 4.0, Version 0.3 , pp. 1-1053, Feb. 19, 2014.

(Continued)

*Primary Examiner* — Jaweed A Abbaszadeh
*Assistant Examiner* — Hyun Soo Kim
(74) *Attorney, Agent, or Firm* — KLIGLER & ASSOCIATES PATENT ATTORNEYS LTD

(57) ABSTRACT

A computer system includes a volatile memory and at least one processor. The volatile memory includes a protected storage segment (PSS) configured to store firmware-authentication program code for authenticating firmware of the computer system. The at least one processor is configured to receive a trigger to switch to a given version of the firmware, to obtain, in response to the trigger, a privilege to access the PSS, to authenticate the given version of the firmware by executing the firmware-authentication program code from the PSS, to switch to the given version of the firmware upon successfully authenticating the given version, and to take an alternative action upon failing to authenticate the given version.

20 Claims, 3 Drawing Sheets

(56) References Cited

U.S. PATENT DOCUMENTS

| | | | |
|---|---|---|---|
| 8,194,642 B2 | 6/2012 | Rosenberg et al. | |
| 8,219,794 B1 | 7/2012 | Wang et al. | |
| 8,346,913 B2 | 1/2013 | Gao et al. | |
| 8,402,453 B2 | 3/2013 | Gupta et al. | |
| 8,745,614 B2 | 6/2014 | Banerjee et al. | |
| 8,782,632 B1 | 7/2014 | Chigurapati et al. | |
| 9,088,584 B2 | 7/2015 | Feng et al. | |
| 9,177,122 B1 | 11/2015 | Trier | |
| 9,182,972 B2 | 11/2015 | Hanselmann | |
| 9,870,219 B1 | 1/2018 | Manthiramoorthy et al. | |
| 10,452,386 B1 | 10/2019 | Kulchytsky et al. | |
| 10,824,501 B2 | 11/2020 | Itkin et al. | |
| 10,838,711 B2 | 11/2020 | Haramaty et al. | |
| 10,984,107 B2 | 4/2021 | Itkin | |
| 11,321,077 B1 * | 5/2022 | Sakthikumar | G06F 21/572 |
| 2002/0092008 A1 | 7/2002 | Kehne et al. | |
| 2003/0028800 A1 | 2/2003 | Dayan et al. | |
| 2003/0188176 A1 | 10/2003 | Abbondanzio et al. | |
| 2004/0024860 A1 | 2/2004 | Sato et al. | |
| 2004/0042547 A1 | 3/2004 | Coleman | |
| 2004/0083476 A1 | 4/2004 | Zhou et al. | |
| 2004/0131115 A1 | 7/2004 | Burgess et al. | |
| 2005/0021968 A1 | 1/2005 | Zimmer et al. | |
| 2005/0114846 A1 | 5/2005 | Banks et al. | |
| 2005/0114894 A1 | 5/2005 | Hoerl | |
| 2005/0125519 A1 | 6/2005 | Yang et al. | |
| 2006/0233182 A1 | 10/2006 | Appanna et al. | |
| 2007/0174685 A1 | 7/2007 | Banks et al. | |
| 2007/0183493 A1 | 8/2007 | Kimpe | |
| 2007/0192610 A1 | 8/2007 | Chun et al. | |
| 2007/0300207 A1 | 12/2007 | Booth et al. | |
| 2008/0126541 A1 | 5/2008 | Rosenberg et al. | |
| 2008/0165952 A1 | 7/2008 | Smith et al. | |
| 2008/0195693 A1 | 8/2008 | Gao et al. | |
| 2009/0063108 A1 | 3/2009 | De Atley et al. | |
| 2009/0089774 A1 | 4/2009 | Lynch et al. | |
| 2009/0199049 A1 | 8/2009 | Yorimitsu | |
| 2010/0199272 A1 | 8/2010 | Mahajan et al. | |
| 2012/0072893 A1 | 3/2012 | Gupta et al. | |
| 2012/0166781 A1 | 6/2012 | De Cesare et al. | |
| 2012/0210115 A1 | 8/2012 | Park et al. | |
| 2012/0291021 A1 | 11/2012 | Banerjee et al. | |
| 2013/0024677 A1 | 1/2013 | Smith et al. | |
| 2013/0036298 A1 | 2/2013 | De Atley et al. | |
| 2013/0047031 A1 | 2/2013 | Tabone et al. | |
| 2013/0145359 A1 | 6/2013 | Hanselmann | |
| 2013/0155902 A1 | 6/2013 | Feng et al. | |
| 2013/0254906 A1 | 9/2013 | Kessler et al. | |
| 2013/0262612 A1 | 10/2013 | Langas et al. | |
| 2014/0047174 A1 * | 2/2014 | Sakthikumar | G06F 12/1425 711/163 |
| 2014/0189673 A1 | 7/2014 | Stenfort et al. | |
| 2014/0317350 A1 | 10/2014 | Langas et al. | |
| 2015/0058979 A1 | 2/2015 | Peeters et al. | |
| 2016/0266894 A1 | 9/2016 | Panicker et al. | |
| 2017/0063539 A1 | 3/2017 | Balakrishnan et al. | |
| 2017/0147356 A1 | 5/2017 | Kotary et al. | |
| 2017/0168803 A1 | 6/2017 | Katyar et al. | |
| 2017/0346631 A1 | 11/2017 | De Atley et al. | |
| 2018/0067800 A1 | 3/2018 | Gusev et al. | |
| 2020/0026427 A1 | 1/2020 | Peleg et al. | |
| 2021/0240489 A1 * | 8/2021 | Xie | G06F 21/572 |

OTHER PUBLICATIONS

Unified Extensible Firmware Interface (UEFI) Specification, Version 2.7—Errata A, Chapter 31, pp. 1765-1798, Aug. 2017.

Implementation Guidance for FIPS 140-2 and the Cryptographic Module Validation Program, National Institute of Standards and Technology Communications Security Establishment, pp. 1-237, Mar. 28, 2003.

FIPS PUB 140-2—"Security Requirements for Cryptographic Modules", pp. 1-69, May 25, 2001.

PKCS#1—Cryptography Standard, Version 2.2, published by RSA Laboratories, pp. 1-63, Oct. 27, 2012.

FIPS PUB 180-4—"Secure Hash Standard (SHS)", pp. 1-36, Aug. 2015.

FIPS PUB 198-1—"The Keyed-Hash Message Authentication Code (HMAC)", pp. 1-13, Jul. 2008.

Wikipedia, "Firmware", pp. 1-6, Jul. 23, 2019.

Tremaine et al., "Pinnacle: IBM MXT in a memory controller chip," IEEE Micro, vol. 21, No. 2, pp. 56-68, Mar.-Apr. 2001.

Brocade, "Network OS 7.0.1 for Brocade VDX", Release Notes v4.0, pp. 1-199, Aug. 24, 2016.

Anonimous Authors, "Method of Verifying Dynamic Firmware Update Prior to Promotion," IP.com Electronic Publication, pp. 1-5, Sep. 10, 2013.

International Application # PCT/IB2021/061995 Search Report dated Apr. 4, 2022.

* cited by examiner

SECURE IN-SERVICE FIRMWARE UPDATE

FIELD OF THE INVENTION

The present invention relates generally to secure update of computer systems, and particularly to methods and systems for secure in-service firmware update in computer systems.

BACKGROUND

Computer systems that run service programs, such as network elements, data-center servers, mobile-telephony base-stations, payment systems, database query systems and others, are typically required to provide continuous service.

U.S. Pat. No. 10,838,711 describes a method and apparatuses for altering the configuration of a system including a processor, firmware storage and a scratchpad from a first configuration in which a first version of firmware enabling a first plurality of system operations is run by the processor, into a second configuration in which a second version of firmware enabling a second plurality of system operations is run by the processor, including re-configuring the system from the first configuration into an intermediate configuration, while the system is in the intermediate configuration, disallowing at least one of the first plurality of operations, re-configuring the system, from the intermediate configuration to the second configuration, and while the system is in the second configuration, allowing the second plurality of operations.

U.S. Patent Application Publication 2016/0266894 proposes an approach that contemplates systems and methods to support performing a live update or upgrade of a firmware of an embedded networking device to a successful completion without resetting the embedded networking device. For the live update or upgrade, a new version of the firmware is installed seamlessly on the embedded networking device to replace the current version of the firmware on one or more cores at a time. During the live firmware updating or upgrading process, various software applications running on other cores of the embedded networking device continue to perform packet processing operations without any interruption.

SUMMARY OF THE INVENTION

An embodiment of the present invention that is described herein provides a computer system including a volatile memory and at least one processor. The volatile memory includes a protected storage segment (PSS) configured to store firmware-authentication program code for authenticating firmware of the computer system. The at least one processor is configured to receive a trigger to switch to a given version of the firmware, and, in response to the trigger, to obtain a privilege to access the PSS. The at least one processor is further configured to authenticate the given version of the firmware by executing the firmware-authentication program code from the PSS, to switch to the given version of the firmware upon successfully authenticating the given version, and to take an alternative action upon failing to authenticate the given version.

In some embodiments, the computer system further includes a read-only-memory (ROM), which is configured to store one or both of (i) part of the firmware-authentication program code and (ii) data used by the firmware-authentication program code, wherein, in response to the trigger, the at least one processor is configured to obtain a privilege to access both the PSS and the ROM.

Typically, the at least one processor is configured to obtain the privilege, authenticate the given version and switch to the given version, without a reset. In an embodiment, in response to a reset, the at least one processor is configured to boot an initial version of the firmware, to authenticate the initial version of the firmware, and to load the firmware-authentication program code to the PSS.

In some embodiments, the computer system further includes a privilege control circuit that is configured to grant the privilege to access the PSS to the at least one processor, in response to detecting that the at least one processor accesses a defined address. In an embodiment, the computer system further includes input interfaces, and the at least one processor is configured to ignore inputs from the input interfaces while having the privilege to access the PSS.

In some embodiments, the volatile memory and the at least one processor are included in a network device. The network device may include one of a network adapter, a network switch, a network router and a network-enabled Graphics Process in Unit (GPU).

There is additionally provided, in accordance with an embodiment of the present invention, a method including storing firmware-authentication program code, for authenticating firmware of a computer system, in a protected storage segment (PSS) of a volatile memory. A trigger to switch to a given version of the firmware is received. In response to the trigger, a privilege to access the PSS is obtained, and the given version of the firmware is authenticated by executing the firmware-authentication program code from the PSS. A switch is made to the given version of the firmware upon successfully authenticating the given version, and an alternative action is taken upon failing to authenticate the given version.

There is additionally provided, in accordance with an embodiment of the present invention, a method for securely switching firmware versions in a computer system. The method includes storing, in a protected storage portion of a volatile memory, software program code which authenticates firmware of the computer system. A trigger to switch to a given version of the firmware is received. In response to the trigger, (i) a privilege to access the protected storage portion is obtained, (ii) the given version of the firmware is authenticated by executing the software program code stored in the protected storage portion, (iii) if the given version is authenticated successfully, a switch is made to the given version of the firmware, and (iv) if the given version is not authenticated successfully, an alternative action is taken.

The present invention will be more fully understood from the following detailed description of the embodiments thereof, taken together with the drawings in which:

DETAILED DESCRIPTION OF EMBODIMENTS

Overview

Traditionally, activating a new firmware version in a computer system entails rebooting, including activation of authentication software to make sure that the new firmware version is trustworthy. Numerous methods have been devised to verify the reliability of the firmware and protect it against attacks. Example techniques can be found, for example, in "Security Requirements for Cryptographic Modules, implementation Guidelines," NIST-FIPS 140-2, initially released on Mar. 28, 2003. As mentioned above, a key element of the methods is typically the rebooting of the computer system.

However, in some computer systems that are configured to provide continuous service (e.g., network switches, database query systems and many others), firmware update should be done with minimum (or no) disruption to the service, and rebooting is highly undesirable.

Updating of the firmware with minimum or no disruption to the service will be referred to as "in-service firmware update." The updating of the firmware may comprise two parts—installing the new firmware in the computer system, and the activation of the new firmware. In terms of both security and service disruption, the critical part is typically the latter—the new firmware may be loaded in the background and typically poses no security risk until activated.

Embodiments of the present invention that are disclosed herein provide methods and systems wherein new firmware may be activated with both minimal disruption and full security verification. In some embodiments, the computer system comprises a Protected Storage Segment (PSS); a processor of the computer system loads the PSS, during boot, with trusted firmware authentication code, and locks the PSS against all accesses until released (typically for execute-only) when an external trigger event indicates that the computer system should switch the running firmware to a new version (that has been pre-loaded to the computer system memory).

In some embodiments, the external trigger causes a processor of the computer system to access a preset location in memory (referred to hereinbelow as "singular address"); the computer system comprises a privilege logic circuit, which is configured to detect accessing of the singular address by the processor, and, responsively, to immediately modify access restrictions set by the privilege logic, including allowing the processor to execute: the code stored in the PSS and to read an attestation security key from a non-volatile memory of the computer system.

Thus, upon a suitable external trigger, one of the processors of the computer system will securely authenticate the new firmware, by running the code in the PSS and by reading an attestation key, without a need to reboot the computer system. If the authentication passes, the new firmware will take over. More details be disclosed in the description of example embodiments hereinbelow.

System Description

Figure 1:
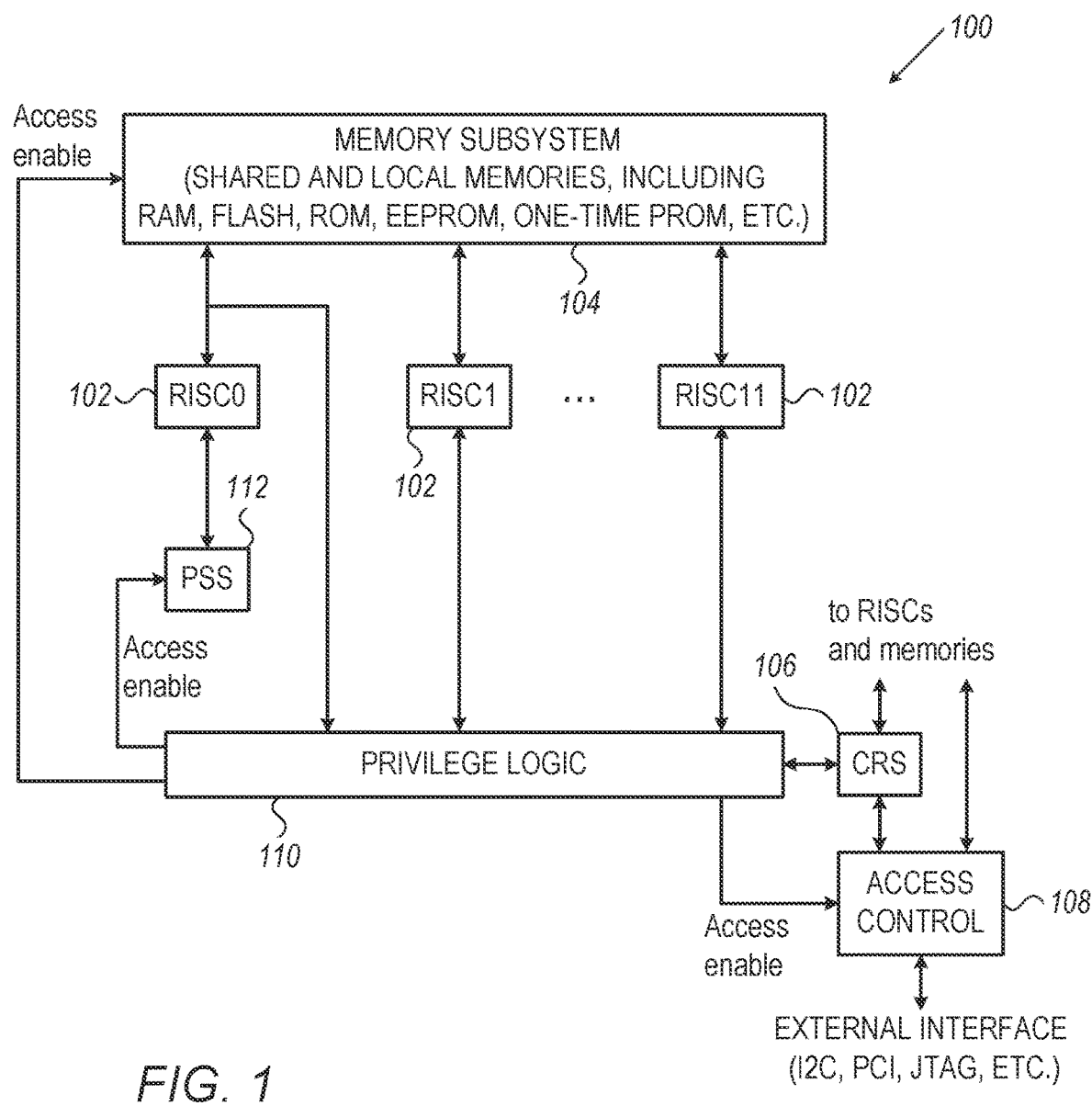
FIG. 1 is a block diagram that schematically illustrates a computer system, in accordance with an embodiment of the present invention.

FIG. 1 is a block diagram that schematically illustrates a computer system 100, in accordance with an embodiment of the present invention. In some embodiments system 100 comprises, or is embedded in, a network device. The network device may comprise, for example, a network adapter such as an Ethernet Network Interface Controller (NIC) or an Infiniband™ Host Channel Adapter (HCA), a network switch or router, a network-enabled Graphics Processing Unit (CPU), or any other suitable type of device capable of network communication. Alternatively, system 100 may comprise any other suitable type of computer system.

In the example of FIG. 1, computer system 100 comprises Reduced Instruction Set (RISC) processors 102, a Memory subsystem 104, a Control Registers Space (CRS) circuit 106, an Access-Control circuit 108 and a Privilege-Logic circuit 110. According to the example embodiment illustrated in FIG. 1. RISC Processors 102 comprise twelve RISC processors; in alternative embodiments, however, any suitable number of RISC processors may be used, including a single RISC processor. Moreover, in some embodiments other types of processors may be used, such as one or more Graphic Processor Units (GPUs), one or more Complex instruction set Computers (CISCs), and any combination of processors.

Memory Subsystem 104 comprises one or more memories of one or more memory types; the memories may include volatile memories (e.g., Static or Dynamic Random-Access Memories (SRAMs or DRAMs)), Read-Only memories (ROMs), one-time programmable memories (e.g., e-fuse memories), Electrically Erasable Read-Only Memories (EE-PROM), flash memories and/or magnetic memories, for example. Some or all the memories may be shared by a plurality of processors, whereas other memories may be dedicated to specific processors of RISC Processors 102.

CRS 106 comprises configuration registers operable to set system parameters of computer system 100, and to store data generated within the computer system (e.g., by RISC processors 102). CRS 106 is coupled to RISC processors 102 (in some embodiments CRS 106 is coupled to the RISC processors via a system, or a local bus), and, through Access Control circuit 108, to external interfaces with Input-Output devices such as I2C, JTAG and others. Access Control circuit 108 is set by a Privilege Logic circuit 110 to enable or disable accesses between the external interface and one of the CRS, the RISC processors, and the memory subsystem.

Privilege Logic circuit 110 is configured to control access rights between elements of computer system 100, including granting or denying specified RISC processors access rights to individual memory elements (and to individual segments within the memory elements) and to individual CRS registers. Privilege Logic circuit 110 is further configured to allow or disallow access of specified external interfaces by specified RISC processors, and access of CSR registers and memory (or memory segments) by the external interfaces (in some embodiments, more elaborate access rights may be used, e.g., separate rights to write, read or execute, and rights that chance according to the user).

RISC Processors 102 are configured to run programs that are stored in memory subsystem 104, including bootstrap programs that may be stored in ROM and firmware.

Upon reset, computer system 100 authenticates the current firmware using cryptographic techniques (example techniques can be found, for example, in "Security Requirements for Cryptographic Modules, Implementation Guidelines," NIST-FIPS 140-2, cited above; and in "The Keyed-Hash Message Authentication Code," PIPS PUB 198-1, July 2008). Before and during the authentication, Privilege Logic Circuit 110 typically limits access rights to sensitive memory areas and registers. After booting and authentication, the computer system may be "in service", for example, routing packets in a network (if computer system 100 is embedded in a network switch), routing cellphone voice/data information (if the computer system is embedded in a cellular-communication base-station), etc.

According to the example embodiment illustrated in FIG. 1, computer system 100 further comprises a Protected Storage Segment (PSS) 112, which may be, for example, a RAM segment in one of Memory Subsystem 104 memory elements. In some embodiments, upon boot, RISC processors 102 stores a firmware authentication code in PSS 112, and then limit access rights to the PSS. In an embodiment, after storing the firmware authentication code in PSS 112, the RISC processors configure Privilege Logic circuit 110 to allow PSS access only for firmware authentication.

For example, in an embodiment, when new firmware that has been pre-stored in the computer system is to replace the existing firmware, an external trigger event, indicating that a firmware should be switched "in-service", may direct RISC0 to jump to a predefined address (referred to as the "singular address"); PSS 112 may detect that RISC0 jumps to the singular address and modify privilege logic 110, allowing RISC0 to execute code in PSS 112 (and changing other access rights of RISC0); RISC0 will then execute the firmware authentication program that has been stored (following system boot) in the PSS. It should be noted that once RISC0 accesses the singular address, the privilege logic enforcements change; thus, execution of the PSS code adheres to a different set of privilege enforcements.

Since the PSS has been protected from any access, the authentication code is deemed intact and secure, and hence, once authenticated, the new firmware is assumed to be reliable (trustworthy), and can replace the previous firmware. In some embodiments, when RISC0 executes the authentication code that is stored in PSS 112, the Privilege Logic circuit allows RISC0 to read a security key of the computer system (typically stored in a ROM element of memory system 104) in other embodiments, the PSS will allow RISC0 to read the security key when detecting that RISC0 has accessed the predefined singular address.

Thus, according to the example embodiment illustrated in FIG. 1, firmware update is done "in-service", without a need to reboot the computer system.

As would be appreciated, the structure of computer system 100 described above is cited by way of example. Computer systems in accordance with the disclosed techniques are not limited to the description hereinabove. In alternative embodiments, for example, the privilege logic circuit is embedded in one or more of the RISC processors. In an embodiment, CRS 106 may be embedded in one or more of the RISC processors. In some embodiments interface to external IO, such as I2C, PCI, etc., is embedded in one or more of the RISC processors, and Access Control circuit 108 is replaced by an interface-enable input to the corresponding RISC processors.

Method Descriptions

Figure 2:
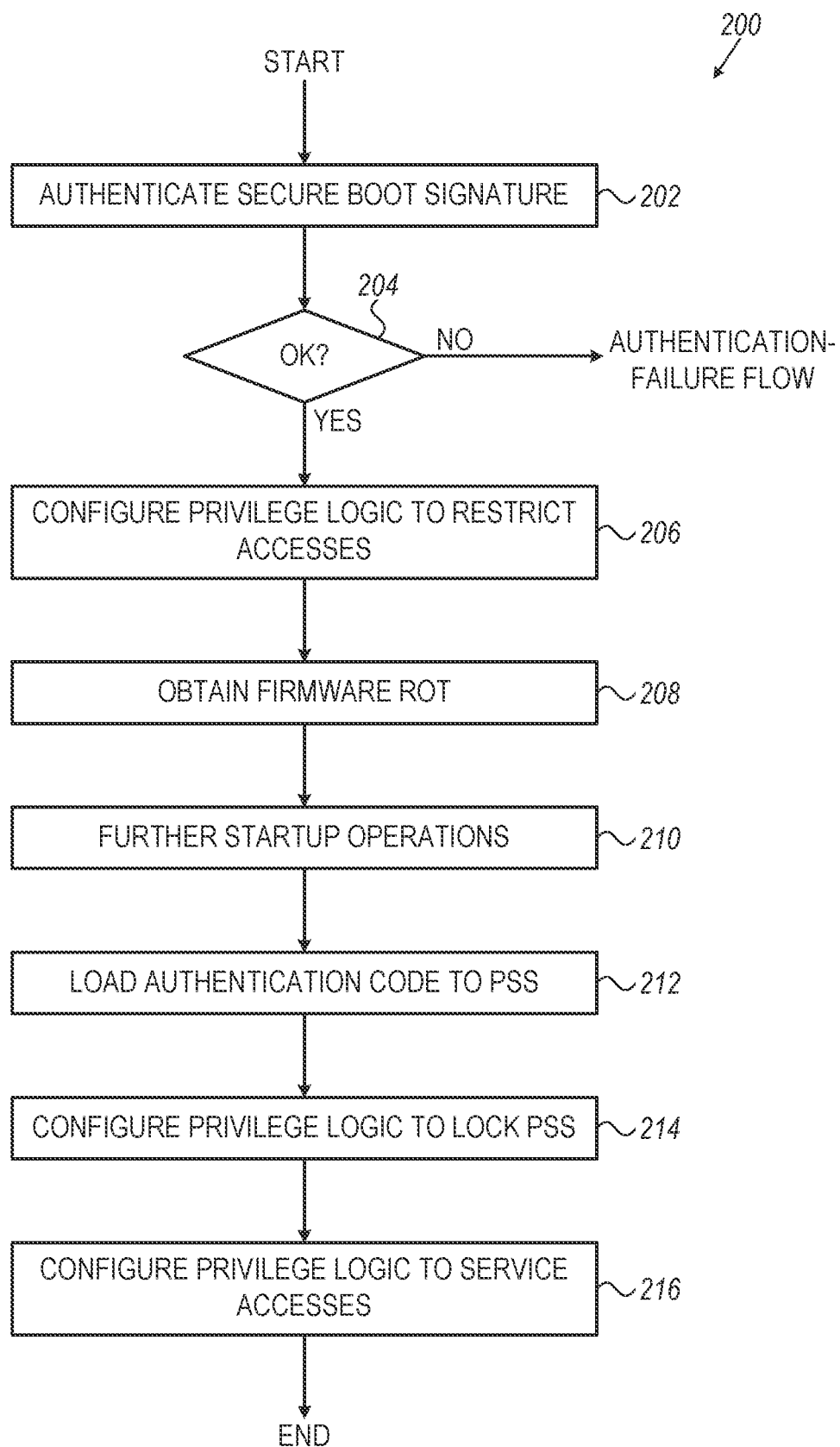
FIG. 2 is a flowchart that schematically illustrates a method for a computer system boot that enables secure in-service firmware update, in accordance with an embodiment of the present invention.

FIG. 2 is a flowchart 200 that schematically illustrates a method for a computer system boot that enables secure in-service firmware update, in accordance with an embodiment of the present invention. The flowchart may be executed by any or some of the RISC Processors 102 (FIG. 1); we will refer to the processor or processors that execute the flowchart as "the processors".

The flowchart starts, after Reset, with an Authenticate Signature step 202, wherein the processors authenticate the secure boot signature, using secure boot techniques, such as those described in the NIST-FIPS 140-2 document cited above. Next, at a Check-Authentication-OK step 202, the processors check the authentication result and enter an Authentication-Failure flow if the authentication fails (Authentication-Failure flow is beyond the scope of the present invention; it may comprise, for example, alerting a user and processor-halt, or taking any other suitable alternative action).

If, in step 204, the authentication passes, the processors enter a Configure-Restricted-Accesses step 206 and configure Privilege Logic circuit 110 (FIG. 1) to restrict accesses and allow only accesses that are needed during the booting process (for example, the processors may restrict IO accesses to some CSR registers and to memory subsystem 104). The processors will then, in An Obtain Firmware-Root-of-Trust (ROT) step 208, run additional authentication to authenticate the firmware and establish ROT (in some embodiment, this may be a two-phase process, including a critical firmware authentication followed by a non-critical firmware authentication).

Next, at a Further-Startup step 210, the processors will execute other startup operations, including, for example, loading of software and data to RAM and sending start-up messages to a user.

The processors then enter a Load-Authentication-Code step 212 and load a firmware authentication code to PSS 112 (as this is a security-critical instance, the processors may precede step 212 with further access restrictions, beyond the restrictions set in step 206).

After loading the authentication code to PSS 112, the processors, in a Configure-PSS-Lock step 214, configure the privilege logic to lock all accesses to the guaranteeing that the security sensitive authentication code will remain intact. The processors then enter a Service-Access-Privilege-Configuration step 216 and set the privilege logic to post-boot service privileges, typically allowing IC and most memory accesses (access to PSS 112, however, will remained locked).

Thus, according to the example embodiment illustrated in FIG. 2, the computer system, following reset, boots a current firmware, establishes ROT, loads a firmware authentication code into the PSS and then protects the PSS against any accesses (except execution following firmware switch, which will be described below, with reference to FIG. 3).

As would be appreciated, the method of flowchart 200 described above is cited by way of example. Flowcharts in accordance with the disclosed techniques are not limited to the description hereinabove. In alternative embodiments, for example, the hierarchical ROT flow may not be used, and, instead, a simple signature-checking authentication may be used.

Figure 3:
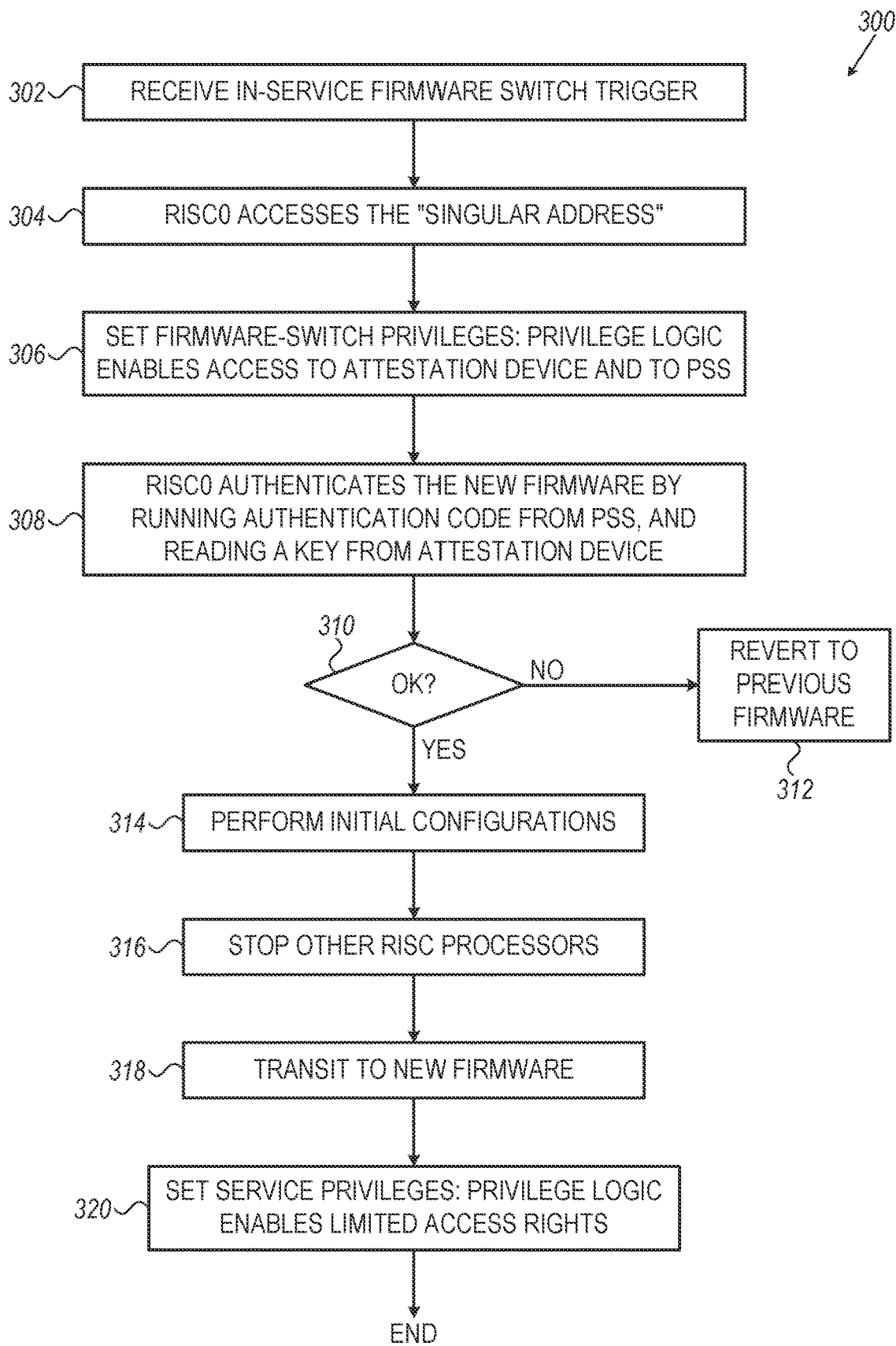
FIG. 3 a flowchart that schematically illustrates a method for in-service firmware switch, in accordance with an embodiment of the present invention.

FIG. 3 is a flowchart 300 that schematically illustrates a method for in-service firmware switch, in accordance with an embodiment of the present invention. The flowchart is executed by RISC0 and by Privilege Logic circuit 110 (FIG. 1). The flowchart starts at a Receive-Firmware-Switch-Trigger step 302, wherein RISC0 receives a trigger indicating in-service switching of firmware. The new firmware is assumed to have been prestored in a Flash memory (of memory subsystem 104, FIG. 1). In an embodiment, the trigger is a supervisory packet that the computer system receives over a network; in some embodiments the trigger may be initiated by a user (e.g., through an external interface to the computer system); in other embodiments the trigger may be initiated by a timer and in yet other embodiments the trigger may be received by any other suitable means.

Responsively to receiving the trigger, RISC0, in an Access-Singular-Address step 304, accesses a predefined address (the "singular address"). The accessing of the singular address is detected by Privilege-Logic circuit 110, which, responsively, in a Set-Firmware-Switch-Privileges step 306, activates a predefined in-service-firmware-switch set of privileges. The set of in-service-firmware-switch privileges includes access rights to the attestation device (typically a ROM or a one-time programmable device), which stores one or more security keys, and to PSS 112

(FIG. 1). The in-service-firmware-switch privileges typically also blocks accesses to other areas that may be sensitive.

Next, RISC0, in an Authenticate-New-Firmware step 308, runs the firmware authentication code that is stored in PSS 112 (the authentication code has been securely loaded to PSS 112, e.g., in step 212 of flowchart 200). While running the authentication code, RISC0 may get the attestation keys from a ROM (the term ROM in the present context includes, for example, mask-ROM, OTP ROM, Field-Programmable ROM and other memory devices that are configured to block write operations).

In a Check-Authentication-OK step 310, RISC0 jumps to a Revert-to-Previous-Firmware step 312 if the authentication fails, or to a Perform-Initial-Configuration step 314 if the authentication passes. (Reverting to the previous firmware typically includes undoing step 306 but may also include other steps and any other suitable steps, including alerting a user and resetting of the computer system.)

In step 314, RISC0 performs initial configuration of the computer system for the new firmware. This may include storing of the newly authenticated firmware caches that cannot be accessed by other entities, and/or merging the old configurations into the new configurations. Additionally, while in step 314, RISC0 may authenticate, the current code that other processors execute (from Flash or from RAM).

Then at a Stop-Other-RISC-Processors step 316, RISC0 stops the operation of all other RISC processors (typically RISC0 will stop operations of the other RISC processors by issuing a low-priority interrupt, allowing the processors to complete any tasks that the processors may be executing, and gracefully stop execution). Next, at a Transit to New Firmware step 318, RISC0 will transit to the new firmware, and the other RISCs will resume operation with the new firmware. Lastly, in a Set-Service-Privileges step 320, RISC0 will indicate to the privilege logic to set the privileges back to SERVICE privilege; and exits the flowchart.

Thus, according to the example embodiment illustrated in FIG. 3, an external switch-firmware trigger causes RISC0 to access the singular address; the accessing of the singular address sets the privileges so that RISC0 will be able to authenticate the new firmware by executing the secure authentication code that has been prestored (during boot) in the PSS and by accessing an attestation key. After the new firmware is authenticated (new ROT is obtained), the new firmware is activated.

As would be appreciated, the method of flowchart 300 described above is cited by way of example. Flowcharts in accordance with the disclosed techniques are not limited to the description hereinabove. In alternative embodiments, for example, the authentication code that is stored in PSS 112 invokes functions that are stored in a ROM. In embodiments, step 308 may be executed by a RISC processor (or by a plurality of RISC processors) other than RISC0. In some embodiments, step 316, wherein RISC0 stops the execution of other processors is omitted—instead, any RISC processor that completes its current task will load the new firmware.

Although the embodiments described herein refer mainly to secure in-service switching of firmware, the disclosed techniques may be applicable, mutatis mutandis, to in-service authentication of the running firmware, which may be done once every predefined period (or, for better protection, randomly).

The different elements of computer system 100, including any or all processors 102, Privilege Logic circuit 110 and other subunits of the computer system may be implemented using suitable hardware, such as in one or more Application-Specific Integrated Circuits (ASICs) or Field-Programmable Gate Arrays (FPGAs), using software, using hardware, or using a combination of hardware and software elements.

In some embodiments, any, or all RISC processors 102 comprise one or more general-purpose programmable processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Although the embodiments described herein mainly address in-service firmware updating and switch-over, the methods and systems described herein can also be used in other applications.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A computer system, comprising:
    a volatile memory, comprising a protected storage segment (PSS), the PSS configured to store firmware-authentication program code for authenticating firmware of the computer system; and
    at least one processor, configured to:
        receive a trigger to switch to a given version of the firmware;
        in response to the trigger, obtain a privilege to access the PSS, and authenticate the given version of the firmware by executing the firmware-authentication program code from the PSS; and
        switch to the given version of the firmware upon successfully authenticating the given version, and take an alternative action upon failing to authenticate the given version,
    wherein the at least one processor authenticates the given version of the firmware by applying the firmware-authentication program code to the given version of the firmware and to an attestation key not in the PSS.

2. The computer system according to claim 1, further comprising a read-only-memory (ROM), which is configured to store one or both of (i) part of the firmware-authentication program code and (ii) data used by the firmware-authentication program code, wherein, in response to the trigger, the at least one processor is configured to obtain a privilege to access both the PSS and the ROM.

3. The computer system according to claim 1, wherein the at least one processor is configured to obtain the privilege, authenticate the given version and switch to the given version, without a reset.

4. The computer system according to claim 1, wherein, in response to a reset, the at least one processor is configured to boot an initial version of the firmware, to authenticate the initial version of the firmware, and to load the firmware-authentication program code to the PSS.

5. The computer system according to claim 1, further comprising a privilege control circuit that is configured to grant the privilege to access the PSS to the at least one processor, in response to detecting that the at least one processor accesses a defined address.

6. The computer system according to claim 1, further comprising input interfaces, wherein the at least one processor is configured to ignore inputs from the input interfaces while having the privilege to access the PSS.

7. The computer system according to claim 1, wherein the volatile memory and the at least one processor are comprised in a network device.

8. The computer system according to claim 7, wherein the network device comprises one of a network adapter, a network switch, a network router and a network-enabled Graphics Processing Unit (GPU).

9. A method, comprising:
storing firmware-authentication program code, for authenticating firmware of a computer system, in a protected storage segment (PSS) of a volatile memory;
receiving a trigger to switch to a given version of the firmware;
in response to the trigger, obtaining a privilege to access the PSS, and authenticating the given version of the firmware by executing the firmware-authentication program code from the PSS; and
switching to the given version of the firmware upon successfully authenticating the given version, and taking an alternative action upon failing to authenticate the given version,
wherein authenticating the given version of the firmware is performed by applying the firmware-authentication program code to the given version of the firmware and to an attestation key not in the PSS.

10. The method according to claim 9, further comprising storing in a read-only-memory (ROM) one or both of (i) part of the firmware-authentication program code and (ii) data used by the firmware-authentication program code, wherein obtaining the privilege comprises, in response to the trigger, obtaining a privilege to access both the PSS and the ROM.

11. The method according to claim 9, wherein obtaining the privilege, authenticating the given version and switching to the given version are performed without a reset.

12. The method according to claim 9, and comprising, in response to a reset, booting an initial version of the firmware, authenticating the initial version of the firmware, and loading the firmware-authentication program code to the PSS.

13. The method according to claim 9, further comprising granting the privilege to access the PSS to at least one processor of the computer system, in response to detecting that the at least one processor accesses a defined address.

14. The method according to claim 9, further comprising ignoring inputs from input interfaces of the computer system while having the privilege to access the PSS.

15. The method according to claim 9, wherein storing the firmware-authentication program code, receiving the trigger, obtaining the privilege, authenticating the given version and switching to the given version are performed in a network device.

16. The method according to claim 15, wherein the network device comprises one of a network adapter, a network switch, a network router and a network-enabled Graphics Processing Unit (GPU).

17. A method for securely switching firmware versions in a computer system, the method comprising:
storing, in a protected storage portion of a volatile memory, software program code which authenticates firmware of the computer system;
receiving a trigger to switch to a given version of the firmware; and
in response to the trigger:
(i) obtaining a privilege to access the protected storage portion;
(ii) authenticating the given version of the firmware by executing the software program code stored in the protected storage portion;
(iii) if the given version is authenticated successfully, switching to the given version of the firmware; and
(iv) if the given version is not authenticated successfully, taking an alternative action,
wherein authenticating the given version of the firmware is performed by applying the firmware-authentication program code to the given version of the firmware and to an attestation key not in the PSS.

18. The method according to claim 17, wherein the computer system includes, is, or is embedded in, a network device.

19. The method according to claim 18, wherein the network device comprises one of a network adapter, a network switch, a network router and a network-enabled Graphics Processing Unit (GPU).

20. The method according to claim 17, wherein securely switching the firmware versions is performed without a reset.

* * * * *